United States Patent

[11] 3,626,176

[72] Inventor Taisuke Tsugami
 1-415 Shimoochiai, Shinjuku-ku, Tokyo, Japan
[21] Appl. No. 9,649
[22] Filed Feb. 9, 1970
[45] Patented Dec. 7, 1971

[54] COOLING DEVICE FOR FILM-PROJECTOR LIGHT-UNITS
1 Claim, 3 Drawing Figs.

[52] U.S. Cl. .................................................. 240/47,
 352/202, 353/54, 353/61
[51] Int. Cl. ....................................................... F21v 29/00,
 G03b 21/18
[50] Field of Search............................................ 240/47, 11;
 353/52, 54, 61; 352/202

[56] References Cited
 UNITED STATES PATENTS
2,837,965   6/1958   Goldsmith..................... 353/52 X
3,120,928   2/1964   Gotze............................. 240/47
2,322,945   6/1943   Ligbastre....................... 240/47
3,119,567   1/1964   Schwartz........................ 240/47

Primary Examiner—Richard C. Queisser
Assistant Examiner—Ellis J. Koch
Attorney—Oldham & Oldham ABSTRACT: A cooling device designed to eliminate the danger of glass breakage of the reflector mirror and exfoliation of the film coating thereon as caused under heat radiation from the light source such as a xenon lamp. The device includes air-cooling means for the reflector mirror and a double-wall construction of the light-source casing defining water jackets therein. Cooling air supplied to the bottom of the casing is directed through inner and outer concentric annular passages formed in the supply duct and, owing to the particular formation of the outlet ends of the respective air passages, opening close to the central aperture formed in the reflector mirror, flows radially along the inner and outer surfaces of the mirror. Cooling water is supplied to circulate through the water jackets formed in the bottom and sidewalls of the casing.

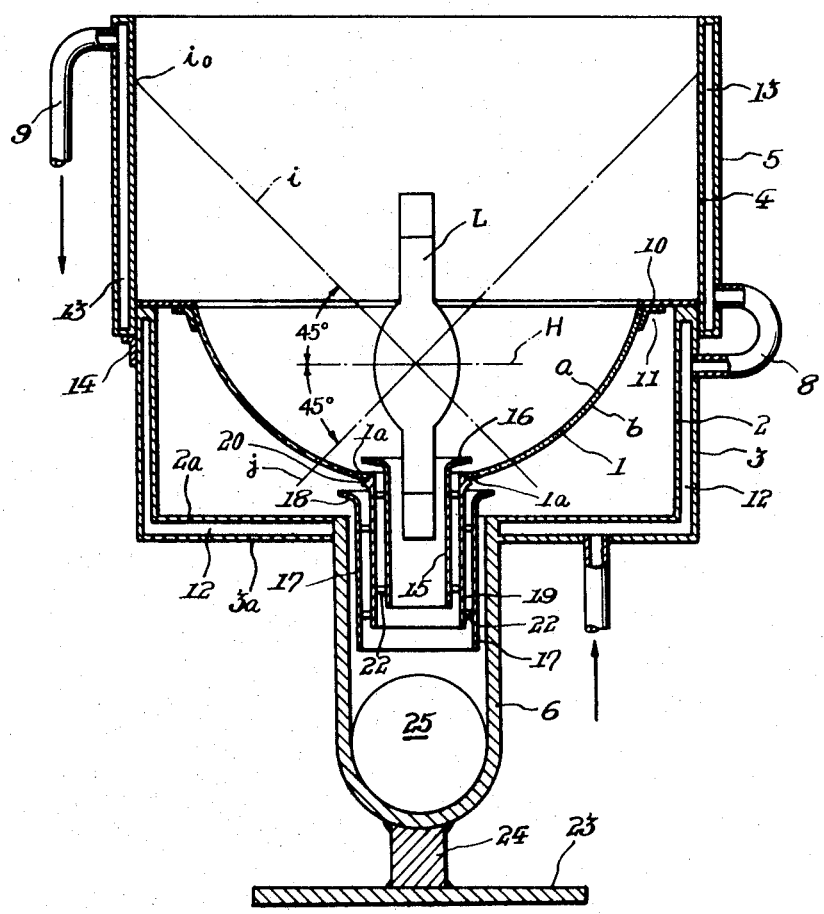

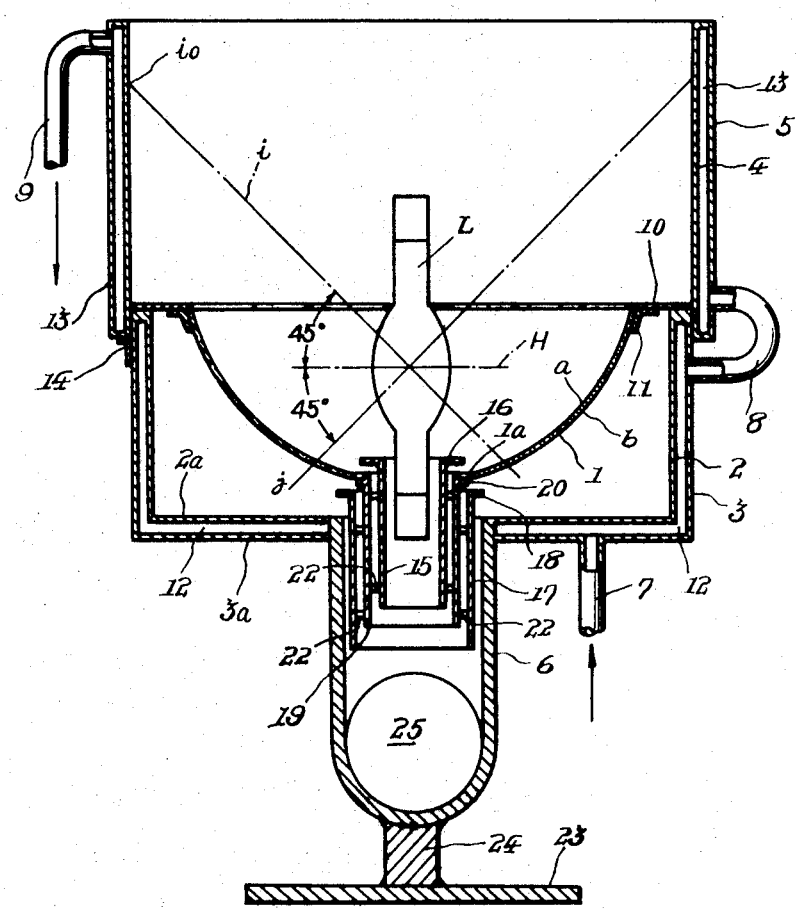

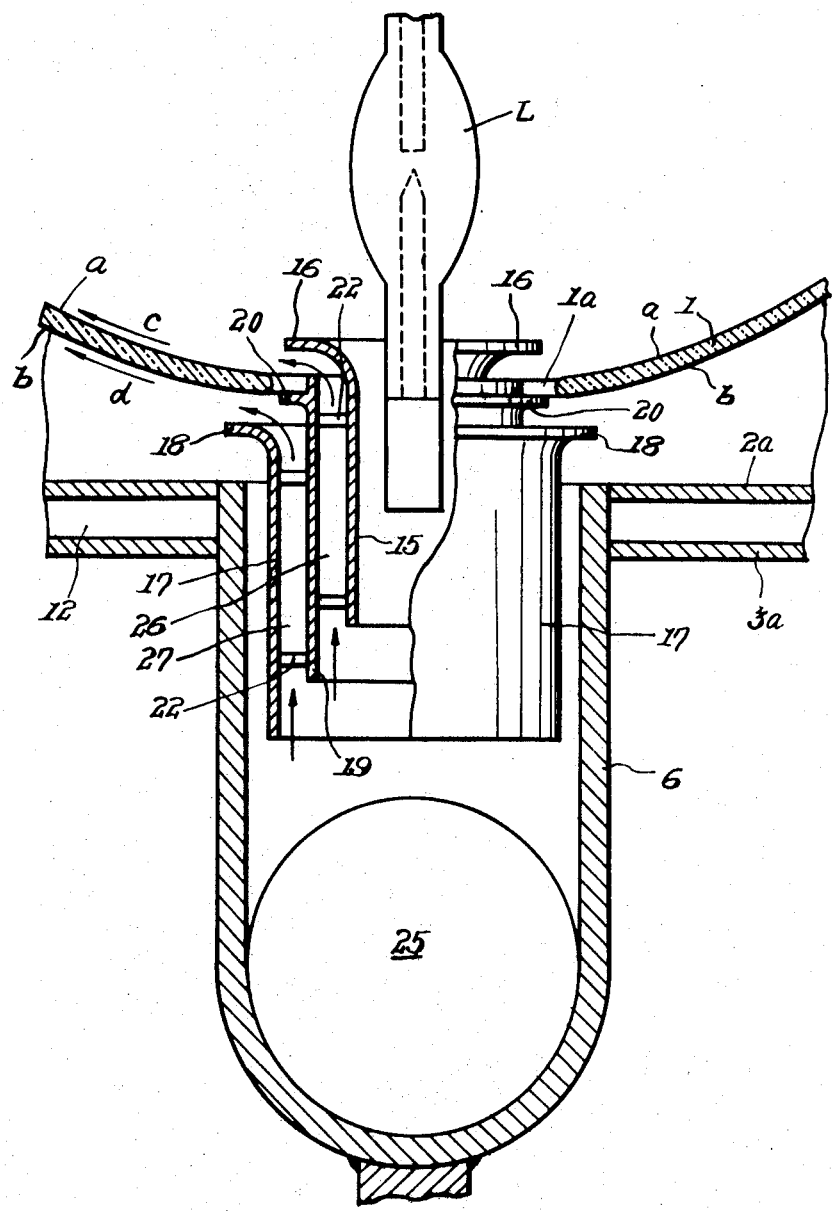

3,626,176

COOLING DEVICE FOR FILM-PROJECTOR LIGHT-UNITS

This invention relates to cooling devices for film-projector light-source units and particularly for those of the type used in high-power film projectors.

Film-projector light-source units of the type described generally include major component parts such as a light-source lamp, a reflector mirror and a casing enclosing such components. As light-source lamps, tungsten lamps are used primarily for midget or small-sized projectors while xenon lamps are preferred for large-sized projectors such as those for theater use.

The present invention relates specifically to cooling devices for light-source units of the type usable in large-sized film projectors and employing as a light-source a xenon lamp in the range of from 5 KW to 20 KW, and is designed to cool both the reflector mirror facing the light-source, and the light-source box or casing enclosing the light-source lamp and reflector mirror with efficiency thereby to prevent any undesirable rise in temperature of these components of the light-source unit.

Reflector mirrors most widely used in film projectors are generally in two types; one type includes ellipsoidal mirrors made of glass and carrying a vapor-deposition of aluminum or silver and the other type includes so-called cold mirrors which are ellipsoidal mirrors coated with a thin film.

Reflector mirrors, being arranged immediately adjacent to the light-source, are heated in use by the radiant energy from the light-source which includes infrared or heat rays and are thus susceptible to breakage. Particularly in cases of cold mirrors, there is a danger that the film coating on the glass surface be exfoliated therefrom or the glass body of the mirror itself break under the heat effect of the light-source.

Xenon lamps, usable as a light-source in a film projector, exhibit a color temperature substantially the same as that of the sun and the radiation from xenon lamps includes not only visible light rays but also a large amount of infrared radiation and a lesser amount of ultraviolet radiation. These radiations are partly absorbed by the glass material of the reflector mirror and converted therein into heat energy, raising the temperature of the mirror. Thus, the temperature of the reflector mirror rises fast as soon as the light-source lamp is turned on and falls by natural cooling when the lamp is turned off.

It is said that the reflector mirror is more liable to break in the course of natural cooling than when it is being heated this, it is supposed, is due to the fact that the rate of natural cooling of the mirror cannot be uniform over its entire surface, giving rise to local temperature differences and hence thermal stress in the mirror material.

In cases of so-called cold mirrors, the film coated over the glass surface of the mirror is liable to separate therefrom making the mirror itself unable to function as a reflector mirror. The film separation is probably due to the fact that the glass material of the mirror and the film material used have different coefficients of thermal expansion.

A primary object of the present invention is to prevent any substantial temperature rise of the reflector mirror under heat radiation from the light-source thereby to prevent breakage of the reflector mirror and separation of the film coating thereon. To attain this object, the inventor proposes to direct a flow of cooling air to the central apertured region of the reflector mirror and to cause such air flow to proceed in separate streams radially outwardly along the inner and outer curved surfaces of the mirror.

Another difficulty previously encountered with large-sized film projectors employing, for example, an 8 KW xenon lamp bulb has been an inconvenience that the light-source box surrounding the lamp and the reflector mirror tends to become excessively hot. In the case of an 8 KW xenon lamp it emits radiant energy of approximately 4 KW and about one-half of this amount of energy is constituted by infrared rays, the rest being comprised of visible and ultraviolet rays. These different rays from the light-source lamp are absorbed in the inside surfaces of the light-source box and raise its temperature. As the box grows hot, it starts to emit heat rays as a secondary radiation and thus heat the component parts enclosed in the box, including the reflector mirror and electric wiring, and at times the light-source box is itself heated to such an extent as to make the operator unable to touch or feel its outer wall by hand.

Another object of the present invention is to provide a light-source box of double-wall construction defining water jackets between the inner and outer walls for circulation of cooling water and in which the heat emitted by the light source such as a xenon lamp bulb is effectively absorbed by the water circulating through the box wall and carried away, preventing any undesirable temperature rise of the box itself.

These and other objects, features and advantages of the present invention will become apparent from the following description when taken in conjunction with the accompanying drawings, which illustrate a few preferred embodiments of the invention and in which:

FIG. 1 is an axial cross section of a light-source unit embodying the present invention:

FIG. 2 is a view similar to FIG. 1, and showing a modification of the unit shown in FIG. 1; and FIG. 3 is a fragmentary enlarged cross section of the embodiment of FIG. 1, illustrating the air streams flowing along the inner and outer surfaces of the reflector mirror to cool the latter efficiently.

Referring to FIGS. 1 and 2, in which like reference numerals indicate like parts, a light source in the form of a xenon lamp bulb L has such a polar light-distribution characteristic that it emits intense light rays in an angular range defined by straight lines $i$ and $j$, which extend at respective angles of $\pm 45°$ to the horizontal line H drawn through the center of light source. The light rays emitted outside this range are of very weak intensity and carry only a little heat energy.

In the illustrated embodiments, the reflector mirror 1 is a cold mirror as is conventional with large-sized film projectors. As usual, the cold mirror 1 is made of glass and coated with a multilayer film so as to reflect visible rays while transmitting infrared rays. In case the light-source bulb L is a xenon lamp, about one-half of the radiant energy impinging upon the cold mirror 1 is comprised of infrared rays, as stated hereinbefore, the reflector mirror 1 and light-source box 2, 4 are protected against any undesirable temperature rise under such infrared radiation, as will be described below in detail.

Referring again to FIGS. 1 and 2, reference numeral 6 indicates a tubular are duct provided to supply air for cooling reflector mirror 1 and secured to the machine frame 23 by way of a leg member 24. The air duct 6 is also fixed at its top end to the bottom portion 2-3 of the light-source box and connected by way of a conduit 25 to an appropriate blower or other source of cooling air not shown. Arranged in the tubular air duct 6 are concentric tubes including an inner tube 15, an outer tube 17 and a partition tube 19 arranged between the inner and outer tubes with a plurality of spacer elements 22 arranged both inside and outside the partition tube 19 to fix the three tubes relative to each other. At their top ends, these tubes present themselves into or close to a circular aperture 1a, which is formed in the center of the ellipsoidal reflector mirror 1. The inner 15 and outer 17 tubes, in the embodiment shown in FIG. 1, have their respective top end portions 16 and 18 formed to flare outwardly along the inner and outer surfaces of the reflector mirror. In the modification shown in FIG. 2, the inner and outer tubes 15 and 17 are formed with circumferential top flanges 16 and 18, which extend radially outwardly at right angles to the common axis of the tubes.

In either of the FIG. 1 and FIG. 2 embodiments, the intermediate or partition tube 19 is formed adjacent to its top end with a circumferential flange 21, which extends closely to the peripheral edge of the central aperture 1a, formed in the reflector mirror 1.

With the construction, described above, it will be observed that a portion of the air being supplied through conduit 25 and air duct 6 and flowing toward the light source lamp L and the central region of the reflector mirror 1 passes through the inner annular air passage 26 (FIG. 3) defined between the inner and partition tubes 15 and 19 and, under the guidance of the flared top end 16 (FIG. 1) or horizontal top flange 16 (FIG. 2) of the inner tube 15, proceeds in the direction indicated by the arrow $c$ in FIG. 3 along the inner surface $a$ of the reflector mirror 1. Another portion of the cooling air passes through the outer annular air passage 27 (FIG. 3), defined between the partition and outer tubes 19 and 17, and, under the guidance of the flared top end 18 (FIG. 3) or the horizontal top flange 18 (FIG. 2) of the outer tube 17, proceeds in the direction indicated by the arrow $d$ in FIG. 3 along the outer surface $b$ of the reflector mirror 1. In this manner, the reflector mirror 1 though heated by the infrared radiation from xenon lamp L is effectively air-cooled and safely protected against any substantial temperature rise.

According to the above-described feature of the present invention, it will be appreciated that the difficulties previously encountered with light-source units of the type described, including the danger of breakage of the mirror body glass or separation of the film coating thereon, can readily be overcome and thus the service life of the reflector mirror is substantially extended.

Description will next be made of another feature of the present invention again with reference to FIGS. 1 and 2, in both of which the light-source box is shown as including top and bottom sections and the bottom section has a peripheral double wall, including inner and outer walls 2 and 3, and a bottom double wall, including upper and lower wall 2$a$ and 3$a$ (FIG. 3), both double walls together forming a lower mirror jacket 12, which receives cooling water from an appropriate pump or other water source through an inlet conduit 7. Preferably, black frosting paint is applied to the inner surface of the inner wall 2 to enable the latter to absorb infrared radiation with efficiency. With this construction, it will be readily appreciated that any infrared or heat radiation emitted by the light source L and transmitted through the reflector mirror 1 is effectively absorbed by the water circulating through the lower water jacket 12 of the light-source box.

In order to enable the upper section of the light-source box to absorb those infrared rays which proceed outwardly upward from the lamp L and are not intercepted by the reflector mirror 1, the upper peripheral wall portion of the light-source box is also of a double-wall structure substantially the same as that of the lower box section 2–3 and includes an inner and an outer wall 4 and 5, defining therebetween an upper water jacket 13. The double-wall or jacket structure is mounted on the lower box section by means of a plurality of support brackets 14 secured to the outer wall 3 of the lower water jacket 12.

A curved pipe section 8 is provided to communicate the top portion of the lower water jacket 12 and the adjacent bottom portion of the upper water jacket 13, thus enabling supply of the cooling water from the lower to the upper water jacket. The cooling water, circulating through the upper water jacket 13, leaves it through an outlet 9 fixed to the top end of the jacket 13 and recirculates. It is desirable that the inner surface of the inner wall 4 of the upper water jacket 13 is also frosted by black painting.

The upper water jacket 13 should have a height exceeding the level $i_o$, at which the 45° rays from lamp L strike the inner wall of the jacket, as shown in FIG. 1, in order to prevent any intense rays from the light source from overflowing the peripheral wall of the light-source box.

As shown in FIGS. 1 and 2, the reflector mirror 1 is supported along its periphery on a mounting frame 10 by means of a fixture 11, the mounting frame 10 being fixed to the top end of the lower water jacket 12 by screw means not shown.

The divided structure of light-source box, including the upper and lower water jackets interconnected at the level of mounting of the reflector mirror, is advantageous in that is facilitates the interchanging of the light-source bulb and/or the reflector mirror, which is usually required in use of film projectors.

In the light-source box constructed as described above, it will be readily appreciated that the radiant energy transmitted through the reflector mirror 1 and principally comprised of infrared rays is absorbed by the lower water jacket 12 while the infrared or heat rays as included in the direct radiation upon the upper section of the light-source box are absorbed by the upper water jacket 13 and thus any undesirable temperature rise of the light-source box is effectively prevented by means of the water circulating through the water jackets.

Although a few embodiments of the present invention have been illustrated and described, it will be apparent to those skilled in the art that various changes and modifications may be made therein without departing from the spirit of the invention or from the scope of the appended claims.

What is claimed is:

1. In a light-source unit for a film projector, including a light-source lamp, an ellipsoidal reflector mirror, a casing surrounding said light-source lamp and said ellipsoidal reflector mirror, and an air duct connected to the bottom of said casing axially thereof, a cooling device comprising: means for cooling said reflector mirror, including inner and outer concentric air passages (26,27) of annular cross section arranged in said air duct (6) to receive cooling air and having respective outlet ends presented to an aperture (1$a$) formed in the center of said reflector mirror (1), said outlet ends being formed to direct the cooling air leaving said annular air passages outwardly along the inner and outer surfaces of said reflector mirror, respectively; a double-wall structure forming the peripheral wall portion of said casing which receives infrared or heat radiation from said light-source lamp directly and through said reflector mirror, said double-wall structure defining therein water jacket means (12,13) to receive cooling water for circulation therethrough; and said casing comprising a lower water jacket (12) defined in a double-wall structure forming that peripheral portion of said casing which receives infrared rays as emitted by the light source and transmitted through said reflector mirror and an upper water jacket (13) defined in another double-wall structure forming that peripheral portion of said casing which receives infrared rays directly from the light source, said lower and upper water jackets being interconnected by a communicating tube (8) with an inlet tube (7) and an outlet tube (9) for cooling water being connected to said lower and upper water jackets, respectively.

* * * * *